July 2, 1940.　　　　H. CLIMER　　　　2,206,764
ROTARY CUTTER
Filed June 3, 1938　　　　4 Sheets-Sheet 1

Herschel Climer,
INVENTOR.

BY *Ch Knowles*

ATTORNEYS.

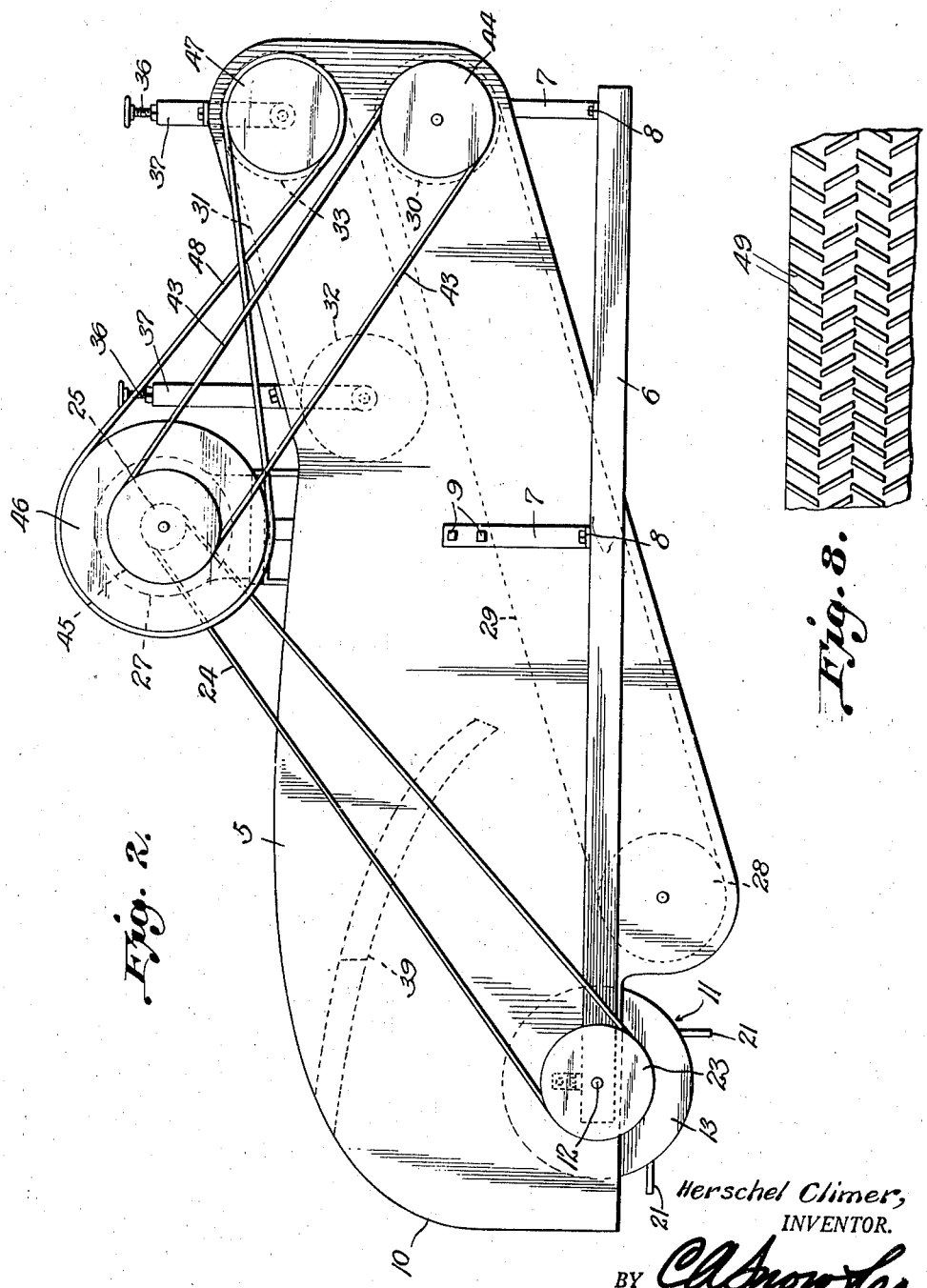

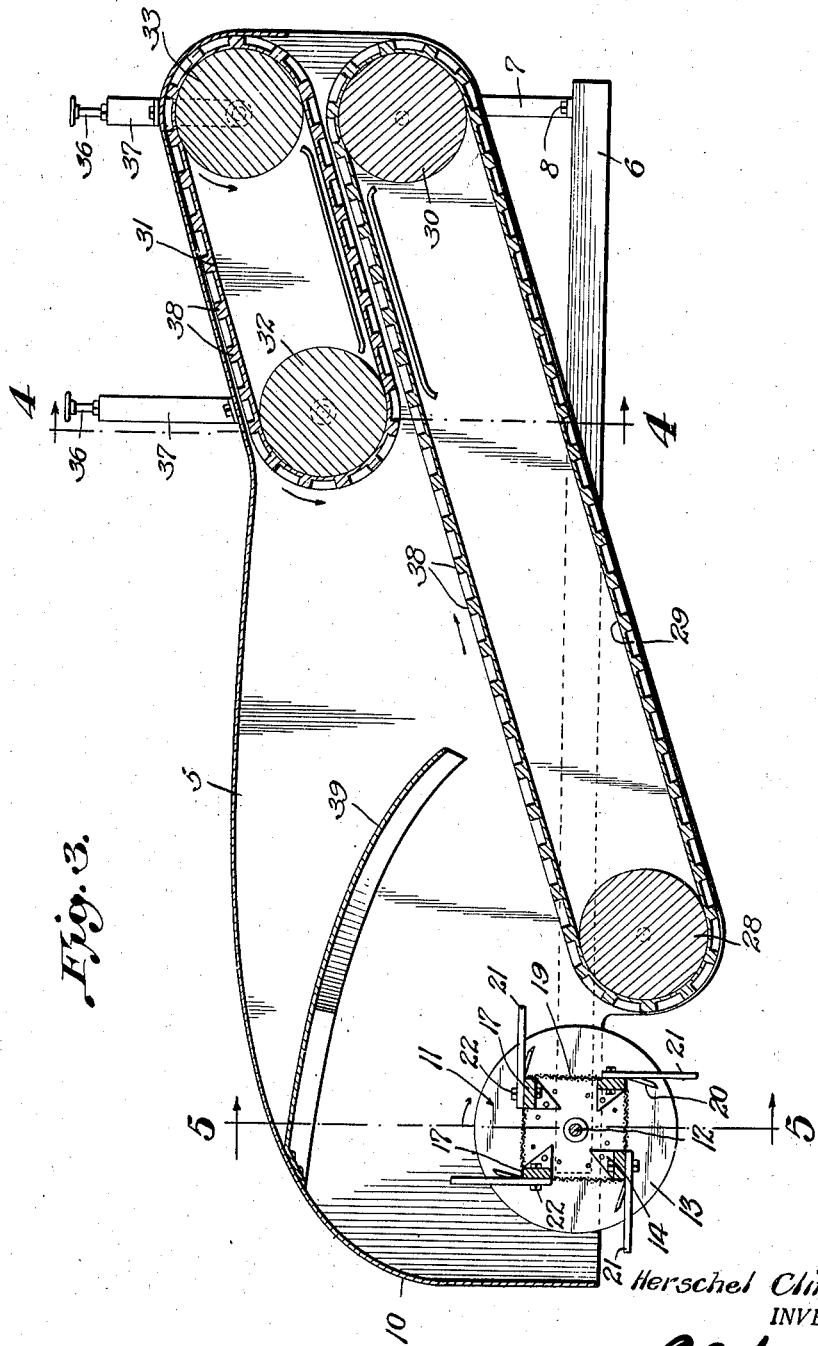

July 2, 1940.  H. CLIMER  2,206,764
ROTARY CUTTER
Filed June 3, 1938  4 Sheets-Sheet 4
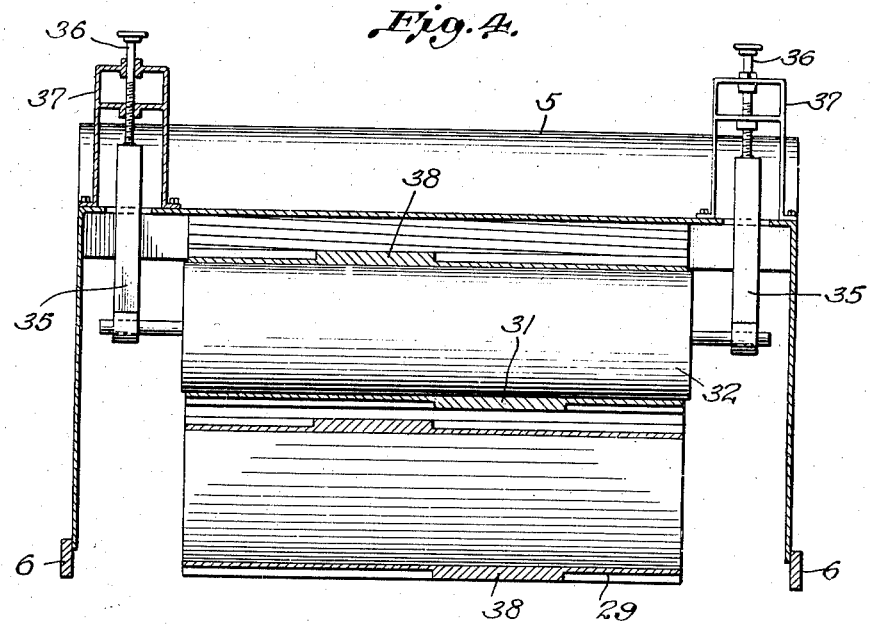
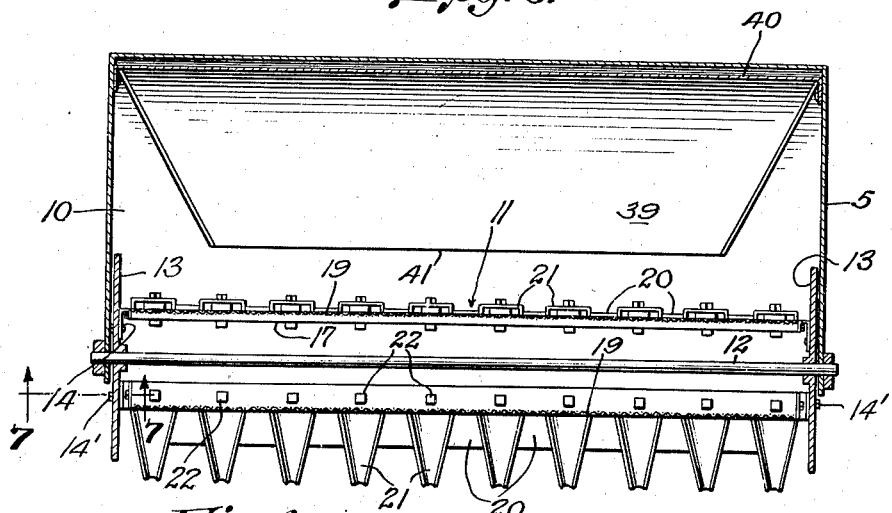
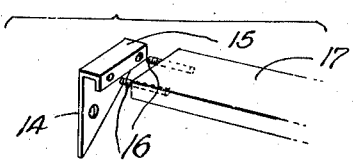
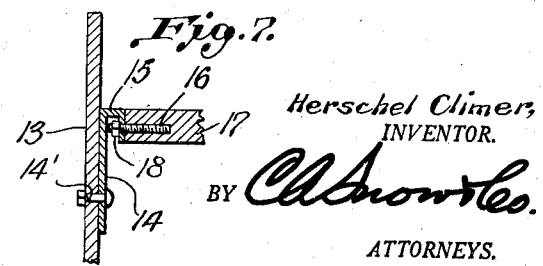
Herschel Climer,
INVENTOR.
BY
ATTORNEYS.

Patented July 2, 1940

2,206,764

UNITED STATES PATENT OFFICE 2,206,764

ROTARY CUTTER

Herschel Climer, Vega, Tex.

Application June 3, 1938, Serial No. 211,664

2 Claims. (Cl. 56—156)

This invention relates to combines, the primary object of the invention being to provide a rotary cutter to be employed in lieu of the usual reciprocating cutter now in common use on combines, thereby providing a cutter used as a part of a combine structure, which will be exceptionally light, efficient in operation, and one which will increase the speed with which the grain may be cut, without the danger of the cutter heating to impair the operation of the combine.

Another object of the invention is to provide a cutter used as a part of a combine, and including a rotary cylinder having knives and scooped fingers arranged adjacent thereto, the construction being such that it will not choke or clog when the cylinder is cutting grain in a field wherein weeds are heavy.

A still further object of the invention is to provide a device of this character wherein the cut grain will be carried rearwardly between endless belts, the belts having ribs thereon which extend at oblique angles with respect to the side edges of the belts, to the end that a rubbing action takes place between the belts, separating the grain from the straw.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a side elevational view thereof.

Figure 3 is a longitudinal sectional view through the body portion of the device.

Figure 4 is a transverse sectional view through the body portion of the device.

Figure 5 is a transverse sectional view taken through the forward end of the body portion, and illustrating the cutting cylinder in section.

Figure 6 is a fragmental detail view illustrating the manner of supporting the cutting blades of the cylinder.

Figure 7 is a longitudinal sectional view through one of the blade supporting brackets of the device.

Figure 8 is a fragmental plan view illustrating a modified form of conveyor.

Figure 1:
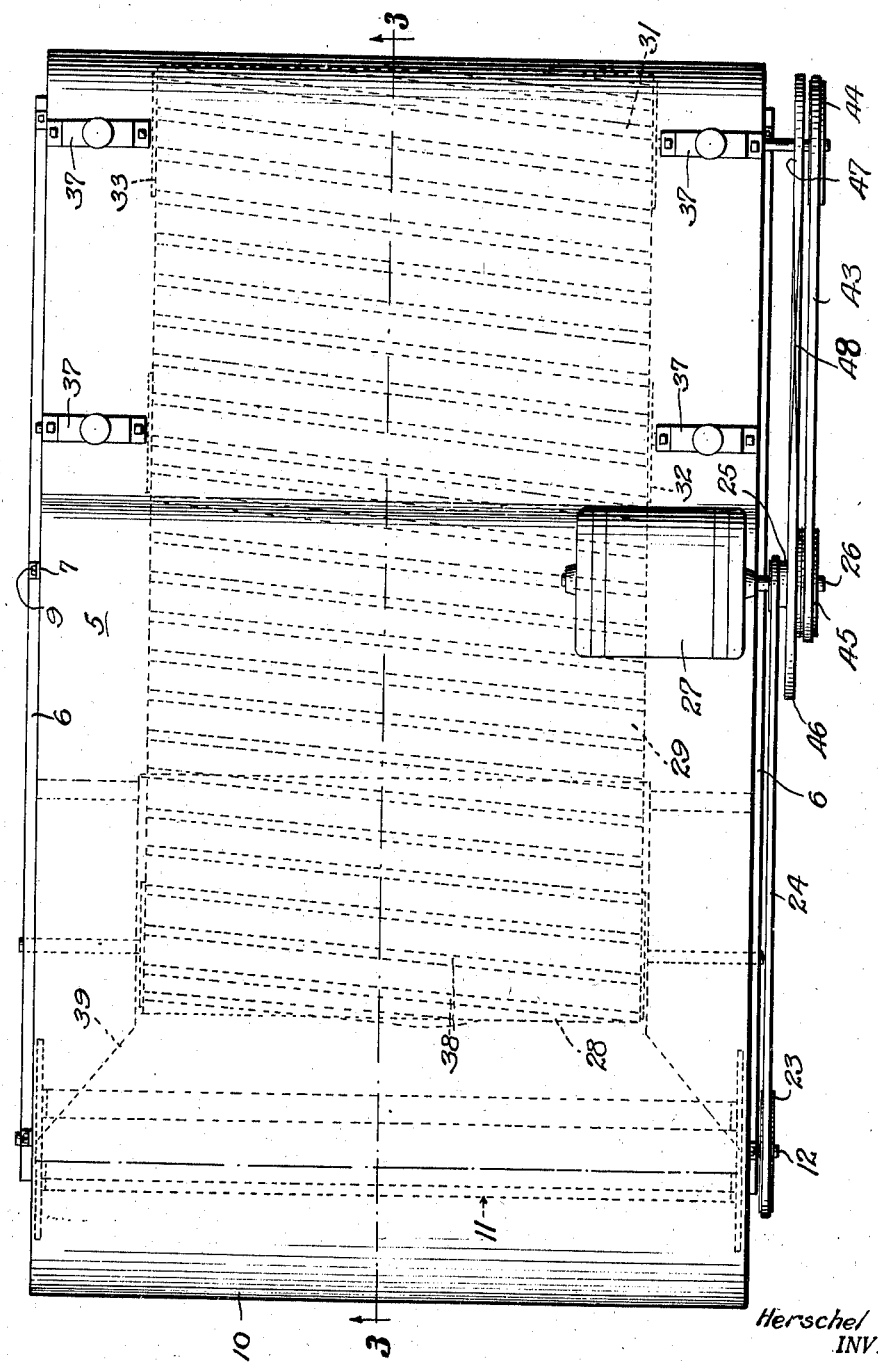
Figure 1 is a plan view of the cutting and threshing mechanism of a combine equipped with a cutting cylinder constructed in accordance with the invention.

Referring to the drawings in detail, the body portion of the device which is indicated generally by the reference character 5, is supported on the side bars 6 that form a continuation of the side bars of the usual combine frame, the bars 6 extending forwardly from the combine.

Arms 7 are connected to the bars 6, by means of bolts 8, the bars 7 being bolted to the sides of the body portion or casing, by means of the bolts 9.

The forward end of the body portion or casing 5, extends downwardly as at 10, where it provides a housing for the rotary cutter 11, forming an important feature of the invention.

The rotary cutter 11 is mounted on the shaft 12 that operates in bearings formed at the forward ends of the bars 6, and includes disk-like end members 13 to which the brackets 14 are adjustably connected by means of bolts 14', so that the angle of operation of the bars 17 and scoops carried thereby, may be changed.

The brackets include inwardly and downwardly extended flanges 15, which are formed with openings to receive the bolts 16 that extend from the ends of the bars 17, there being provided nuts 18 on the bolts 16, for securing the bars in position.

The bars 17 are arranged in spaced relation with each other, and provide support for the wire mesh material indicated at 19 which when properly positioned, provides a hollow cylindrical cutter, as clearly shown by Figure 5 of the drawings.

These bars also provide a support for the blades 20 that are bolted to the bars, the side edges of the blades 20 being inclined to conform to the inclined side edges of the scoops 21 that are also bolted to the bars 17, by means of the bolts 22. Thus it will be seen that due to the construction of the rotary cutter, the grain which is cut by the blades 20, will be carried rearwardly and grain which may be directed laterally, will be caught in the scoops, and thrown rearwardly into the body portion or casing. It may be further stated that these scoops are so designed that when they pass into the grain, the stalks of grain will be spread or separated, directing the stalks to the blades 20. Mounted on one end of the shaft 12, is a pulley 23 over which the belt 24 operates, the belt 24 also moving over the pulley 25 secured to the shaft 26 of the motor 27, so that rotary movement will be imparted to the rotary cutter.

Mounted near the forward end of the body portion, and disposed adjacent to the rotary cutter, is a drum 28 over which one end of the endless conveyor 29 operates, the conveyor also operating over the drum 30 which is supported near the opposite end of the body portion or casing 5, as clearly shown by Figure 3 of the drawings.

Cooperating with the endless conveyor 29, is an endless conveyor 31 which operates over the drums 32 and 33, the drums 32 and 33 being supported in bearings formed at the lower ends of the vertically adjustable bars 35 to which the adjusting screws 36 are connected, the adjusting screws operating through threaded openings formed in the brackets 37, mounted on the body portion or casing.

These endless conveyors 29 and 31, are constructed preferably of rubber and have integral bars 38 formed thereon, which bars are disposed at oblique angles with respect to the side edges of the conveyors, with the result that grain which is fed to the endless conveyor 29, will be rubbed between the bars 38, separating the grain from the hulls.

As shown by Figure 8 of the drawings, the bars 49 are substantially short and are arranged in staggered relation with respect to each other.

A curved apron indicated by the reference character 39 is secured within the body portion or casing, at a point directly above the rotary cutter, the apron being of a width to extend over the entire width of the body portion or casing 5. As clearly shown by Figure 3 of the drawings, this apron 39 is formed with a wide end portion 40 and a narrow end portion 41, the narrow end portion being of a width equal to the width of the endless conveyor 29, so that grain thrown against the apron by the rotary cutter, will be directed downwardly onto the endless conveyor 29, where the grain will be carried to a point directly between the conveyors, which rub the grain, separating the grain and hulls.

After the grain has passed between the conveyors, it is discharged through the opening 42 and carried rearwardly into the cleaning and screening portion of the combine, not shown in the present illustration of the invention.

From the foregoing it will be seen that due to the construction shown and described, the rotary cutter will cut and pick up the grain, carrying the grain rearwardly to be moved longitudinally of the body portion or casing 5, for treatment by contact with the bars of the endless conveyors.

The reference character 43 designates a belt which operates over the pulley 44 of the drum 30, the belt 43 also operating over the pulley 45 that is also secured to the shaft 26 of the motor.

Another pulley indicated by the reference character 46 is secured to the shaft 26, the pulley 46 being substantially large as compared with the pulley 47 which receives motion from the shaft 26, through the pulley 46 and belt 48 which operates over the pulleys 46 and 47.

I claim:

1. A machine of the class described, comprising a body portion, a rotary member mounted at one end of the body portion and providing a rectangular structure, blades extending from the edges of the rotary member, scoops arranged along the edges of the rotary member and disposed in spaced relation with each other, said scoops extending appreciable distances beyond the cutting edges of said blades whereby material cut by the blades may fall laterally into the scoops as the rotary member rotates.

2. In a machine of the class described, a body portion, a rotary member constructed of wire mesh material and rectangular in cross section, mounted at the forward end of the body portion, cutting blades extending from the corners of the rotary member and extending through the length of the rotary member, scoops supported at the corners of the rotary member, the forward ends of the scoops extending appreciable distances beyond the cutting edges of the blades, said scoops having open front ends, said scoops being disposed in spaced relation with each other, and said scoops adapted to receive material cut by the blades, and discharge the material into the body portion.

HERSCHEL CLIMER.